(12) United States Patent
Hao et al.

(10) Patent No.: US 6,979,389 B2
(45) Date of Patent: Dec. 27, 2005

(54) MICRO-ACTUATION APPARATUS FOR HEAD ABS PLANARITY (PTR) CONTROL DURING SLIDER MACHINING

(75) Inventors: Shanlin Hao, Eden Prarie, MN (US); Roger Lee Hipwell, Jr., Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 184 days.

(21) Appl. No.: 10/610,004

(22) Filed: Jun. 30, 2003

(65) Prior Publication Data

US 2005/0006227 A1   Jan. 13, 2005

(51) Int. Cl.[7] ............................................. C23C 14/34
(52) U.S. Cl. ........................ 204/192.33; 204/192.34; 204/298.32; 204/298.36
(58) Field of Search ................ 204/192.33, 192.34, 204/298.32, 298.36

(56) References Cited

U.S. PATENT DOCUMENTS

| | | | |
|---|---|---|---|
| 5,468,177 A | 11/1995 | Kindler et al. | 451/364 |
| 5,632,669 A | 5/1997 | Azarian et al. | 451/54 |
| 5,749,769 A | 5/1998 | Church et al. | 451/5 |
| 6,175,170 B1 | 1/2001 | Kota et al. | 310/40 MM |
| 6,354,438 B1 * | 3/2002 | Lee et al. | 204/298.36 |
| 6,521,902 B1 | 2/2003 | Chang et al. | 250/492.21 |
| 2002/0035778 A1 * | 3/2002 | Hashimoto et al. | 29/603.09 |

OTHER PUBLICATIONS

Article entitled "Robot Leg Motion in a Planarized-SOI, 2 Poly Process," by S. Hollar, A. Flynn, S. Bergbreiter, and K.S.I. Pister.

Article entitled "Single Mask, Large Force, and Large Displacement Electrostatic Linear Inchworm Motors," by R. Yeh, S. Hollar, and K. Pister.

* cited by examiner

*Primary Examiner*—Steven Versteeg
(74) *Attorney, Agent, or Firm*—Kinney & Lange, P.A.

(57) ABSTRACT

An apparatus and method of machining sliders to obtain the optimum PTR for each slider. An array of MEMS devices configured for angular actuation are provided, and a slider is placed in each MEMS device of the array. The ion milling of the sliders is controlled individually for each slider based on the relationship of the ion angle and relative etch rates of the slider components. The MEMS devices are controlled to ensure the ion incidence angle for each slider is such that the desired PTR of each slider is achieved.

34 Claims, 11 Drawing Sheets

MICRO-ACTUATION APPARATUS FOR HEAD ABS PLANARITY (PTR) CONTROL DURING SLIDER MACHINING

CROSS-REFERENCE TO RELATED APPLICATION(S)

None.

BACKGROUND OF THE INVENTION

In a magnetic data storage and retrieval system, a magnetic read/write head, or transducer, is used to read from or write to a data track on the disc. The magnetic read/write head is carried by a slider, which "flies" above the surface of the disc due to the air bearing force produced by the relative motion of the slider and the disc. The slider is formed with an air bearing surface to ensure that the slider flies at the desired fly height above the surface of the disc.

Sliders are typically manufactured in batch mode by forming an array of sliders on a common substrate, often called a wafer. The transducers are built on the substrate using a variety of thin film deposition techniques. The wafer is sliced to produce bars, with one row of sliders in a side-by-side pattern on each bar. The bars are then lapped to define a specified stripe height of the transducer, and to establish the air bearing surface (ABS). After the air bearing pattern is formed on the bars, they are sliced to produce individual heads or sliders. When a slider is finished, the volume of the transducer is typically much smaller than the volume of the substrate.

The portion of the transducer that is nearest the ABS is referred to as the pole tip region. The layers of the transducer, including those in the pole tip region, include both metallic and insulating layers. Thus, the pole tip region has different mechanical and chemical properties than the substrate which forms the slider. These differences in properties create several challenges that affect the manufacturing process. For instance, the layers of the transducing head are lapped at a different rate than the substrate. As a result, when an ABS of the slider is lapped or milled, differing amounts of the layers will be removed—resulting in an uneven ABS.

Commonly, a greater amount of the metallic layers of the transducer will be removed during the lapping process than will be removed from the substrate. This lapping process results in a Pole Tip Recession (PTR) of the metallic layers of the transducer with respect to the substrate. The PTR of a particular layer is defined as the distance between the air bearing surface of the substrate and the air bearing surface of that layer. Positive PTR occurs when the distance between the ABS and the pole region is greater than the distance between the ABS and the substrate so that the pole region is recessed. Negative PTR may also occur when the distance between the ABS and the pole region is less than the distance between the ABS and the substrate, so that the pole region is protruding.

In order to establish adequate electrical performance for high areal density recording heads, it is desired to have a very low magnetic spacing between the head and the disc. PTR from machining (both lapping and ion mill etching) of the slider ABS is one of the key contributing factors in the spacing between the head and the disc. The PTR mean achieved during manufacturing directly adds to the head to disc spacing budget. Similarly, the standard deviation of PTR resulting from current manufacturing methods critically affects the head to disc clearance/contact margin. Specifically, negative PTR may result in contact between the transducer and the surface of the disc, which is highly undesirable.

There have been several efforts to control the manufacturing process to reduce the variation in PTR of sliders. One method of doing so involves measuring the PTR of each slider on a bar after the bar has been lapped. The average PTR of the bar is then calculated, and bars having similar average PTR are grouped together. Next, the bars with similar average PTR are ion milled together to obtain the desired stripe height. However, because these manufacturing methods are based on average PTR, the standard deviation in slider PTR has been unacceptably high.

As the data storage competition is continuous, particularly in light of the desire for high areal density, HMS is reaching 10 nanometers. In order to achieve HMS target and head mechanical reliability performance, a PTR distribution with a near zero mean and very tight standard deviation is required. Thus, there is a need in the art for an improved method of manufacturing sliders to achieve the desired PTR.

BRIEF SUMMARY OF THE INVENTION

The present invention is an apparatus and method for machining sliders in a batch mode using individual slider control. To allow for batch machining of sliders and individual control, an array of MEMS devices is provided for use with a machining device. A slider is placed in each MEMS device in the array, a parameter of each slider is obtained, and the MEMS devices are controlled during machining to individually optimize machining for each slider. More specifically, the present invention allows for individual control of sliders during ion milling to obtain the desired PTR on each slider. To do so, a slider is placed in each MEMS device in the array, the PTR of each slider is obtained, and the MEMS devices are controlled during ion milling to ensure the angle at which the ion beam contacts the slider results in the optimum PTR for that slider.

A variety of MEMS devices capable of angular control are suitable for use with the present invention. Suitable MEMS devices include torsional electrostatically actuated MEMS devices, bimorph and cantilever MEMS devices, and inch worm MEMS devices. To further assist with batch mode processing, the sliders may be connected by a web or on a common substrate to ease the placement of sliders in the MEMS array.

DETAILED DESCRIPTION

Figure 1:
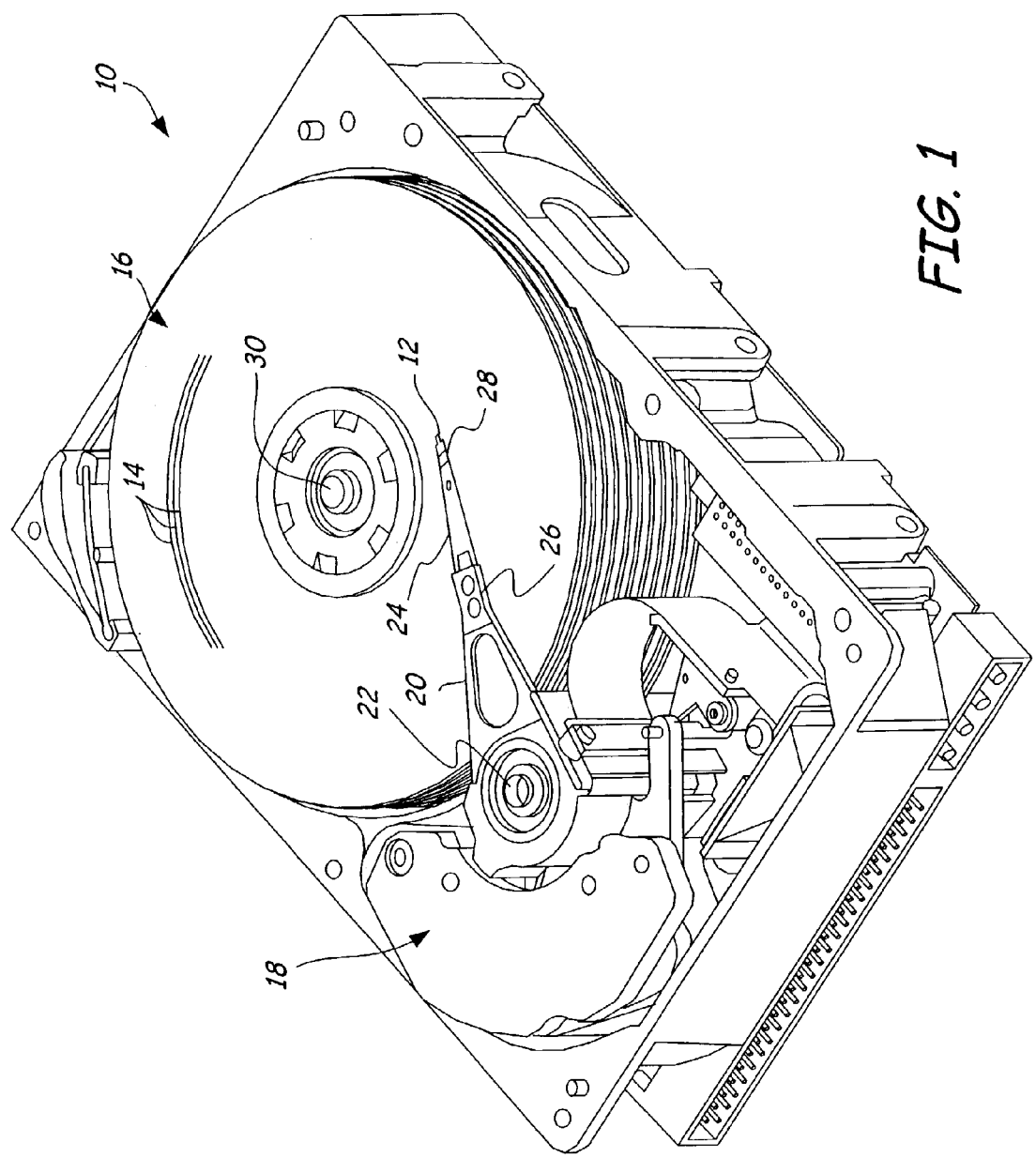
FIG. 1 is a perspective view of a disc drive actuation system for positioning a slider over a disk.

FIG. 1 is a perspective view of a disc drive actuation system 10 for positioning a slider 12 over a selected data track 14 of a magnetic storage medium 16, such as a disc. The actuation system 10 includes a voice coil motor (VCM) 18 arranged to rotate a slider suspension 20 about an axis 22. The slider suspension 20 includes a load beam 24 connected to an actuator arm 26 at a slider mounting block. A flexure 28 is connected to the end of the load beam 24, and carries the slider 12. The slider 12 carries a magneto-resistive (MR) element (not shown) for reading data and a coil element for writing data on the concentric tracks 14 of the disc 16. The disc 16 rotates around an axis 30, which causes the slider 12 to "fly" a small distance above the surface of the disc 16.

Figure 2:
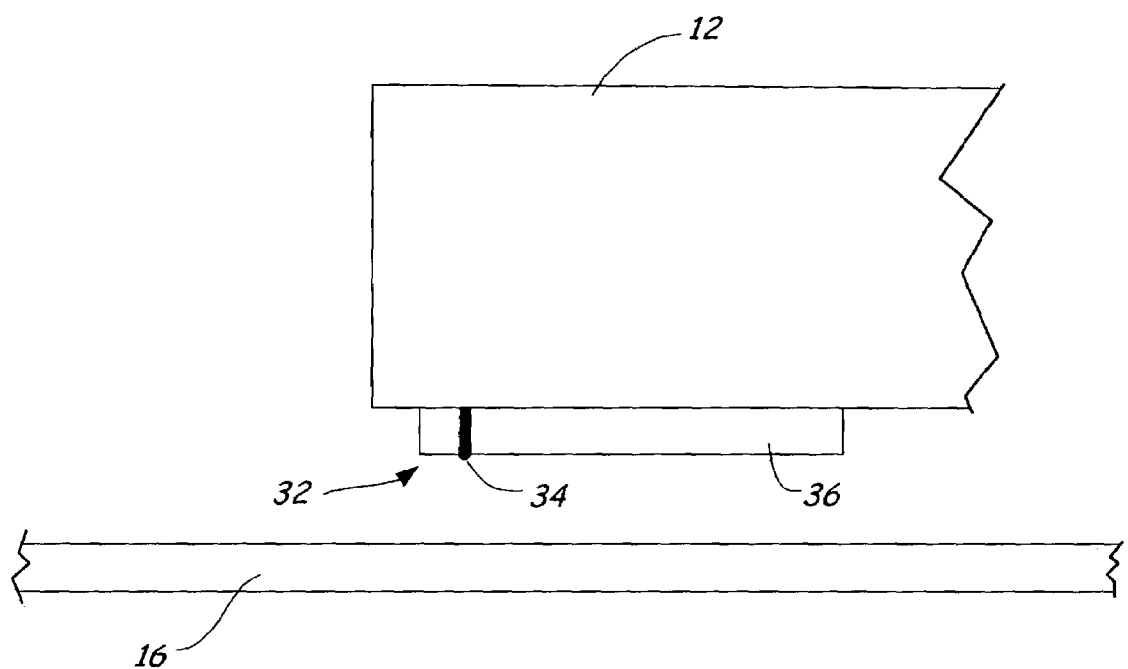
FIG. 2 is a side view of a single slider positioned over a disc.

FIG. 2 is a side view of a single slider 12 positioned over a disc 16. The slider 12 comprises an air bearing surface 32 located adjacent the disc 16, a pole tip region 34, and an air bearing rail 36. The pole tip region 34 corresponds to that portion of the magneto-resistive element that is located at the air bearing surface 32. When forming the slider 12, the ABS 32 is machined, using such processes as lapping and ion-mill etching, to form the features of the ABS including rail 36, and to achieve the desired stripe height of the MR element at the pole tip region 34.

When ion milling the pole tip region 34 of the slider 12, the pole tip material and material from which the slider 12 substrate is formed are milled at the same time. However, because the MR element is often formed of different materials than the substrate of the slider 12, the MR element may be milled at a different rate than the substrate material of the slider 12. In addition, the ion milling etch rate is sensitive to both the material properties of the material being milled, as well as the ion incidence angle.

Figure 3:
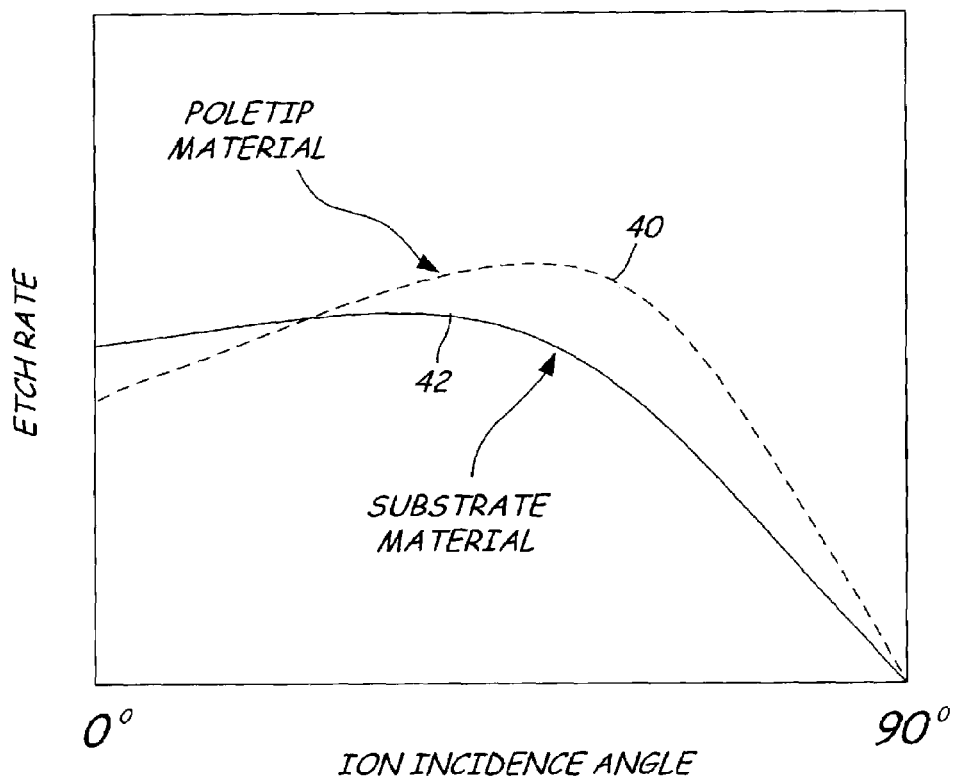
FIG. 3 is a graph showing the etch rate variation due to ion incidence angle for pole tip material and substrate material.

FIG. 3 is a graph illustrating the relationship between the etch rate of the pole tip material and the substrate material as the ion incidence angle varies from 0° to 90°. Shown in FIG. 3 is a first curve 40 corresponding to the etch rate of the pole tip material as the ion incidence angle varies. Also shown is a second curve 42 corresponding to the etch rate of the substrate material of the slider 12 as the ion incidence angle varies. It is possible to use the known relative etch rate between the substrate and pole tip region shown in FIG. 3 to control process conditions during manufacturing to minimize pole tip recession (PTR) in the finished slider 12. Thus, by varying the ion incidence angle during ion milling, different PTR can be achieved on the sliders.

While the relationship shown in the graph of FIG. 3 has been used for bars of sliders having similar average PTR, it has been cost prohibitive to machine each slider individually to obtain the optimum PTR. However, as the need for increased areal density increases, it is necessary to ever more tightly control the PTR of each slider. The present invention makes use of micro-electro-mechanical system (MEMS) devices to implement an individual slider machining control to obtain a PTR distribution with a near zero mean and a very tight standard deviation.

Figure 4:
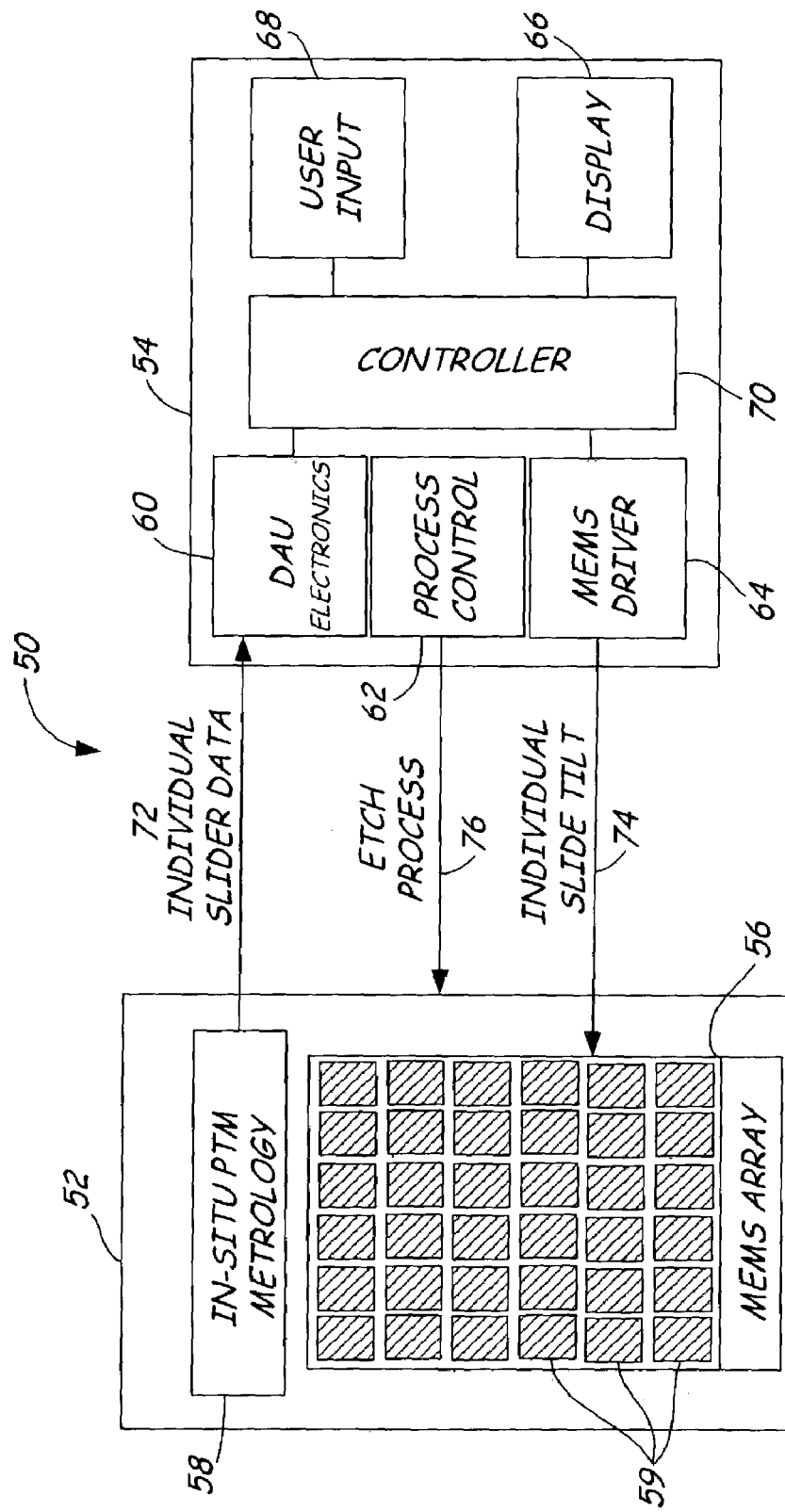
FIG. 4 is a block diagram illustrating the present invention.

FIG. 4 is a block diagram illustrating the features of the present invention. Shown in FIG. 4 is a machine 50, such as an ion mill machine, comprising a machining device 52 and control system 54. The machining device 52 may comprise, for instance, an ion milling device or etching device. The machining device 52 also comprises an array of MEMS devices 56. Optionally, the machining device 52 also comprises in-situ metrology 58. The MEMS array 56 comprises a plurality of individual MEMS devices capable of angular actuation. When included, the in-situ metrology 58 provides a method of measuring a parameter for each slider positioned in the machining device 52.

The control system 54 comprises data acquisition unit (DAU) electronics 60, a process controller 62, a MEMS driver 64, a display 66, a user input 68, and a controller 70. The user input 68 is operably connected to the controller 70, and allows a user to input commands into the control system 54. Similarly, the display 66 is connected to the controller 70 to allow for visual display of information necessary to operate the machine 50. The display 66 and user input 68 comprise the user interface to the control system 54.

The process controller 62 is operably connected to the machining device 52. The process controller 62 is used to control the operation of the machine 50. The process controller 62 may be any suitable controller configured for use with the machining device 52.

The DAU electronics 60 is operably connected to the controller 70. The DAU electronics 60 provides information to the controller 70 relating to an individual parameter of each slider in the machining device 52. When the device 52 is provided with an in-situ metrology device 58, the metrology device 58 is connected to the DAU electronics 60 so that the in-situ metrology device 58 can provide the individual slider data to the DAU electronics 60. In instances where there is no in situ metrology device 58, the data acquisition unit electronics 60 may be configured to receive data regarding individual sliders from any suitable source. For instance, it may be possible to connect an exterior metrology device used to measure individual slider parameters to the data acquisition unit 60. Similarly, the data acquisition unit electronics 60 may comprise a disk drive or similar data transfer device for inputting individual slider data into the control system 54.

The MEMS driver 64, is operably connected to the controller 70 and is also operably connected to the MEMS array 56. The MEMS driver 64 powers each individual MEMS device 59 in the MEMS array 56. More specifically, the MEMS driver 64 is configured to actuate each MEMS device 59 in the MEMS array 56 so that the angle at which the individual MEMS device 59 is oriented can be individually controlled.

In a preferred embodiment, the machine 50 comprises an ion mil machine used in machining sliders to obtain a desired PTR on each slider. When used for PTR ion milling, the machining device 52 comprises an ion milling device, and the optional in-situ metrology 58 comprises in-situ PTR metrology. In operation, the ion mill machine 50 functions as follows. Individual PTR slider data 72 is provided to the DAU electronics 60. As described more fully above, when the ion mill device 52 is configured with an in-situ PTR metrology device 58, the DAU electronics 60 may simply be connected to the in-situ PTR metrology device 58. Otherwise, the individual PTR data 72 is provided to the DAU electronics 60 via any suitable means.

The controller 70 then controls the MEMS driver 64 based on the individual PTR data 72. The MEMS driver 64 provides individual control signals 74 to the MEMS array 56 so that each MEMS device 59 in the MEMS array 56 is individually controlled to tilt the associated slider to the desired angle. The process controller 62 supplies an etch process control signal 76 to the ion mill device 52, thus enabling the ion beam and starting the ion mill process.

To control the etching of the sliders to achieve the desired PTR, the controller automatically controls the position of each slider 12 relative to the ion beam angle of incidence. Based on the known relationship between the etch rate of the pole tip material and the substrate material for a given ion beam angle of incidence, explained above with reference to FIG. 3, the controller 70 positions each slider 12 in the ion mill device 52. In this way, optimum PTR can be achieved for each slider.

In addition to being used for individual PTR control, additional uses for the present invention are contemplated. For example, the machining device 52 and control system 54 of the present invention may be used to optimize batch processing of sliders. When machining a feature on a slider, there is often a relationship between an angle of the feature relative to the mill or etch source and the rate at which the material on the feature is milled or etched. In such instances, it is possible to obtain a measurement relating to a feature of the component, such as the size or thickness of the feature. Each slider in the MEMS array can be individually controlled during machining so that regardless of how much material must be removed, the etch or mill time for the group of sliders is the same. Thus, in a set amount of time, several sliders can be milled or etched in one batch mode by controlling the angle of each slider to ensure the correct amount of material is removed.

Further, the machining device 52 and control system 54 of the present invention may be used for planarity control whenever a feature on a component comprising more than one material must be machined to obtain a desired planarization. When the angle versus relative etch rates for each material are known, it is possible to control the angle of the component during machining (ion milling or etching) to allow batch planarization of the components. To do so, the components are placed in the MEMS array and the angle of each component is controlled during machining based on the known etch rates of the two materials. As a result of the individual angular control, both materials in the component are machined to ensure a planar surface on the component.

Figure 5A:
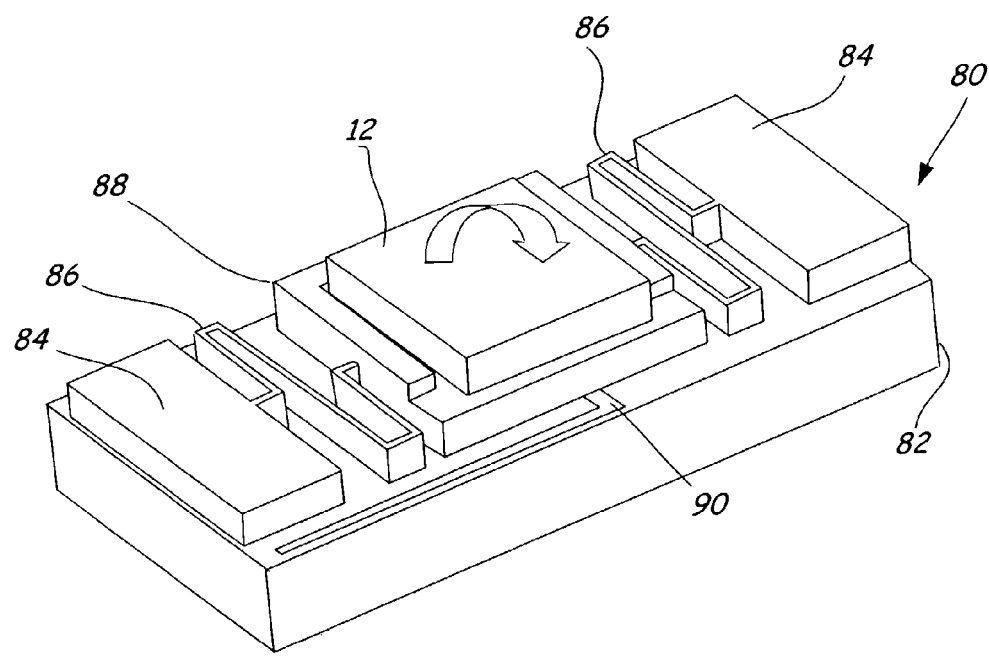
FIG. 5A is a perspective view of one embodiment of an angular MEMS device.
Figure 5B:
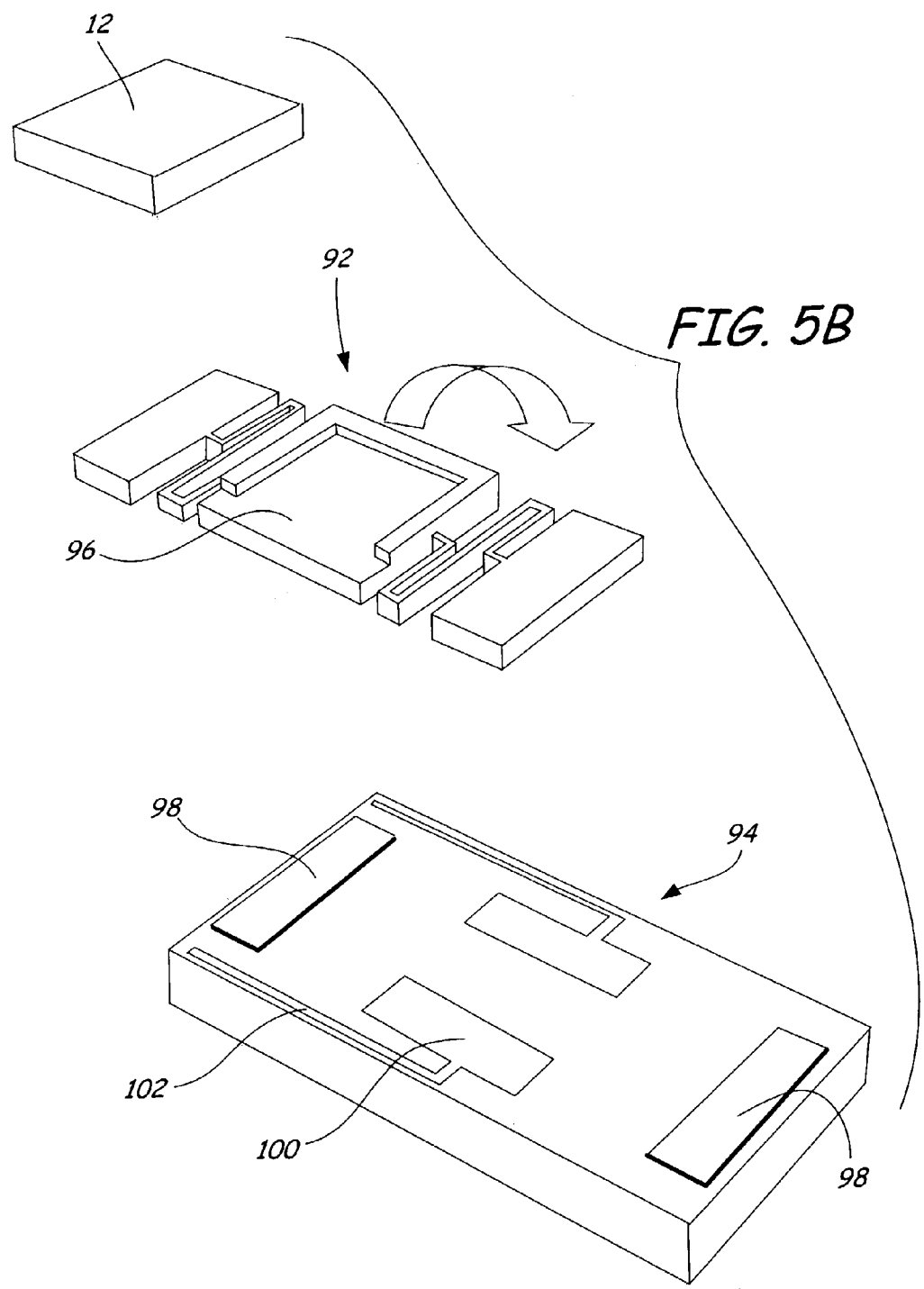
FIG. 5B is an exploded perspective view of the angular MEMS device of FIG. 5A.

There are several varieties of MEMS devices capable of angular actuation, thus making them suitable for use with the present invention. FIGS. 5A–7 illustrate a variety of suitable embodiments of an angular actuator. Specifically FIGS. 5A–5C illustrate a torsional electrostatically actuated MEMS device.

FIG. 5A is a perspective view of a torsional electrostatically actuated MEMS device 80. The MEMS device 80 comprises a base wafer 82, anchors 84, spring flexures 86, a rotating platform 88, and a slider 90. Also located on the base wafer 82 are actuation electrodes 90. As is more clearly illustrated in FIG. 5B, an exploded perspective view of the torsional electrostatically actuated MEMS device 80, the MEMS device 80 comprises a motor portion 92 and wafer portion 94. A slider 12 is configured to connect to the motor portion 92 at a slider receiving cavity 96. Similarly, the motor portion 92 connects to the wafer portion 94 at a spacer layer 98. Also visible in the exploded perspective view of FIG. 413 are the actuation electrodes 100 and leads 102 which provide for electrical connections to the wafer portion 94.

Figure 5C:
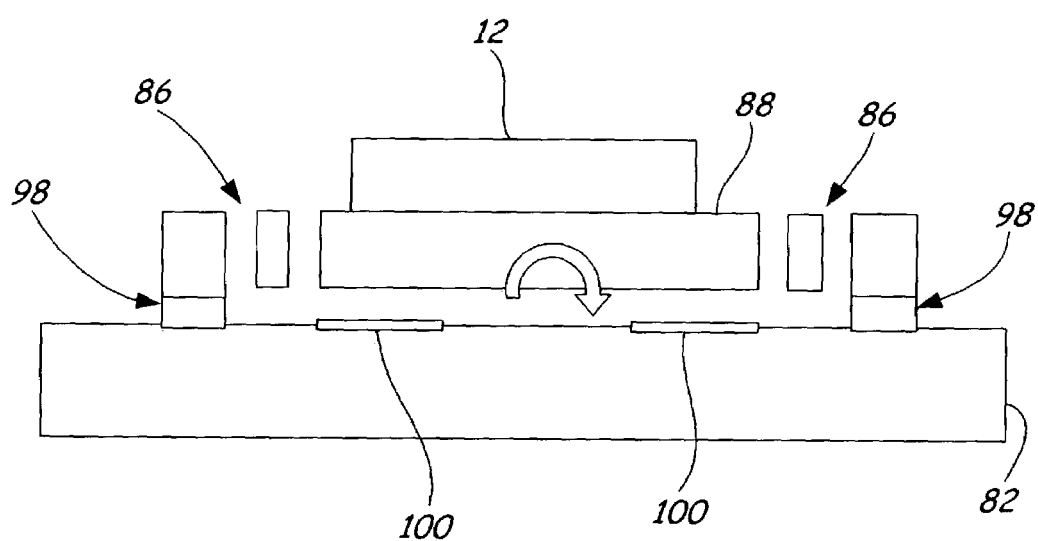
FIG. 5C is a cross-sectional view of the angular MEMS device of FIG. 5A.

FIG. 5C is a cross-sectional view of the torsional electrostatically actuated MEMS device 80. Shown in the cross-sectional view is the base wafer 82, the actuation electrodes 100, the spacer layer 98, the spring flexures 86, the rotating platform 88, and the slider 12. The opposing electrostatic actuation electrodes 100 are used to bias the tilt angle of the rotating platform 88 in either direction of the nominal 45 degree angle of the array. In FIGS. 5A–5C, the spring flexures 86 and electrode 102 designs are for illustrative purposes only, and may differ greatly from a feasible design achieving the desired actuation requirements.

To actuate the torsional electrostatic actuated MEMS device 80, electrostatic voltage potential is applied to one electrode 100. This creates a electrostatic force causing a torque on the suspended rotating platform 88. The compliant spring flexures 86 are designed to be torsionally compliant, but stiff in the vertical access direction. The spacer layer 98 spaces the rotating platform 88 and compliant springs 86 away from the base wafer 82, to allow for torsional movement of the rotating platform 88 based on the application of voltage to the actuation electrodes 100.

The slider 12 can be affixed to the rotating platform 88 in an suitable manner. In addition, the base wafer 82 may be formed of any suitable material, and the motor portion 92 may likewise be formed of any suitable material. One suitable material is silicon, due to its ability to be machined easily in the required small dimensions for making the features of the MEMS device 80.

Figure 6:
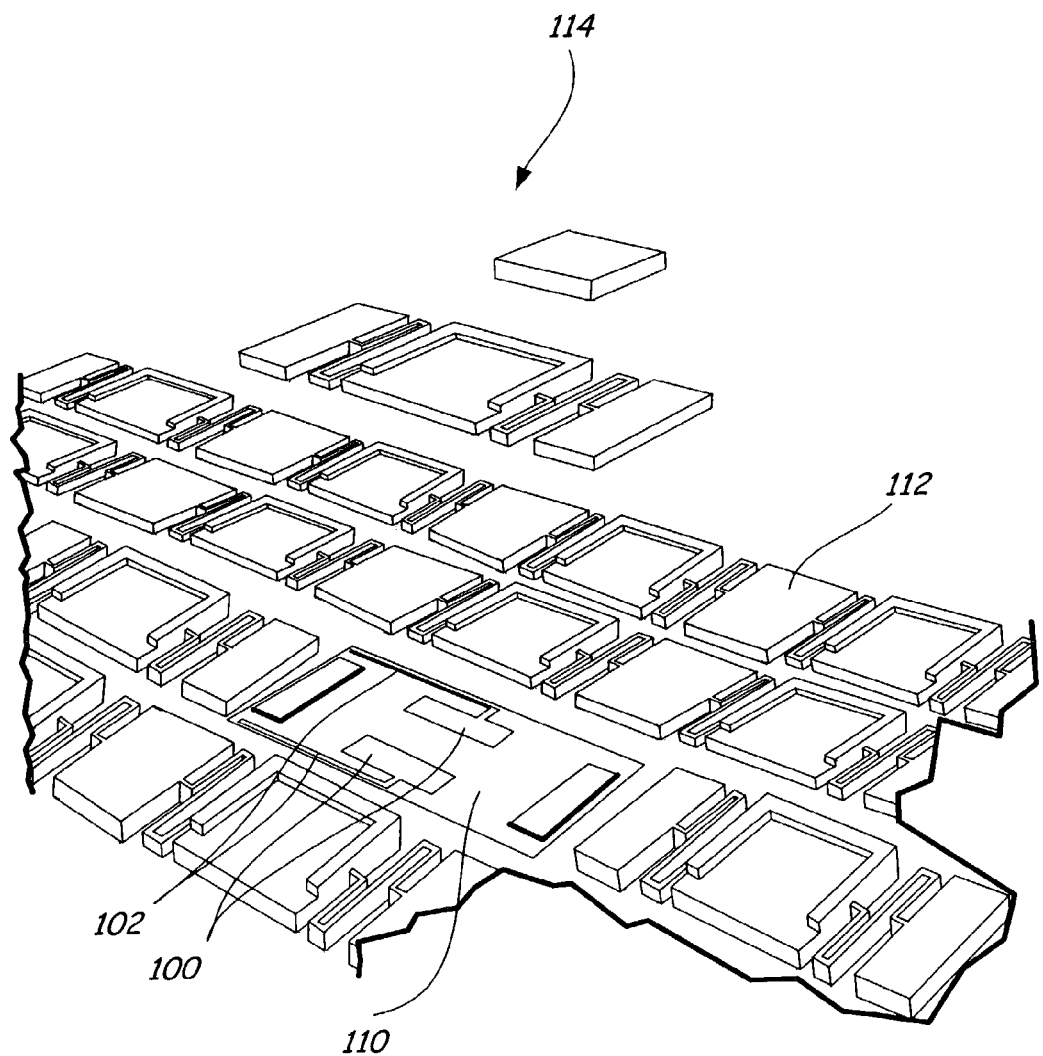
FIG. 6 is a perspective view of an array of angle MEMS devices for use with the present invention.

FIG. 6 is a perspective view of an array of the torsional electrostatically actuated MEMS devices described with reference to FIGS. 5A–5C above. Shown in FIG. 6 is a base 110 which carries a plurality of MEMS devices 112. Also shown is an individual MEMS device 114 in exploded view. Though the two actuation electrodes 100 are visible for the MEMS device 114, the leads 102 are for illustrative purposes only, and would be patterned on the base 110 in a suitable manner to allow for individual actuation of each MEMS device 112 in the array.

Figure 7:
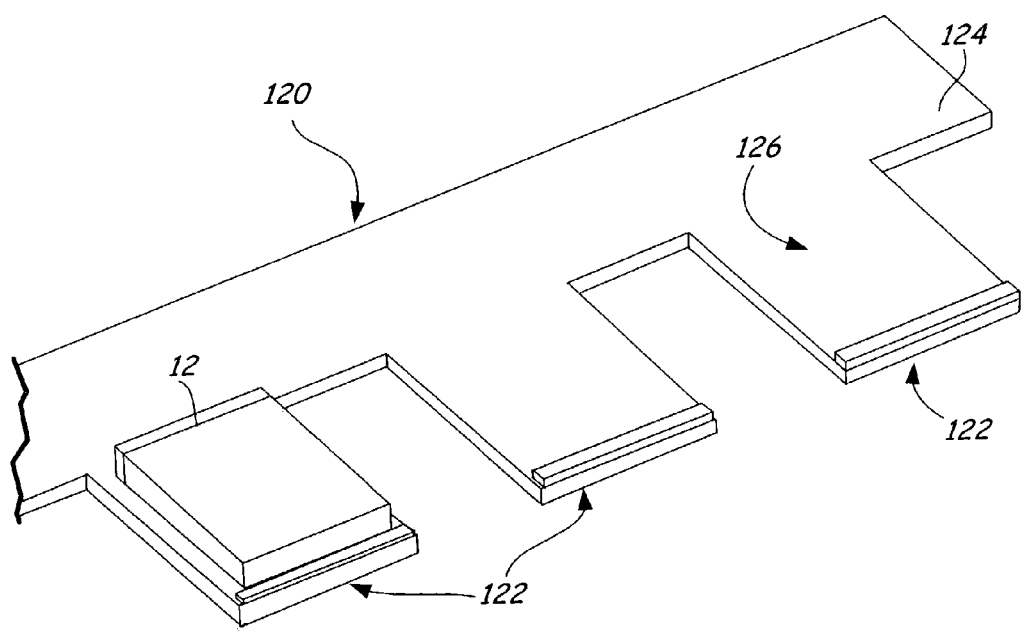
FIG. 7 is a perspective view of a bimorph MEMS device for use with the present invention.

FIG. 7 is perspective view of an alternate MEMS device array. Shown in FIG. 7 is a MEMS device array 120 comprising a plurality of bimorph cantilever type structures 122 formed on a common carrier 124. Each of the bimorph cantilever structures 122 comprises a slider receiving platform 126. Shown on one of the slider receiving platforms 126 is a slider 12.

The cantilever-type MEMS array 120 shown in FIG. 7 may make use of a variety of concepts for angular control. For instance, the cantilever structures 122 may comprise an array of thermal bimorph actuators, shape memory alloys, or piezoelectric elements. When formed with thermal bimorph material, the cantilever structures 122 are actuated based on a thermal expansion difference between a top and a bottom layer of the cantilever-type structures 122. Thus, by controlling the temperature of the bimorph layers, out of plane motion can be used for angular control.

Similarly, it may be possible to form the cantilever structures 122 using a shape memory alloy. When formed of a shape memory alloy, the cantilever structures 122 can be actuated either thermally or electrically. Further, the cantilever-type structures 122 may comprise piezoelectric elements to allow for angular actuation. In such instances, a voltage is applied to the piezoelectric element of the cantilever structure 122 to provide for its angular actuation.

Figure 8A:
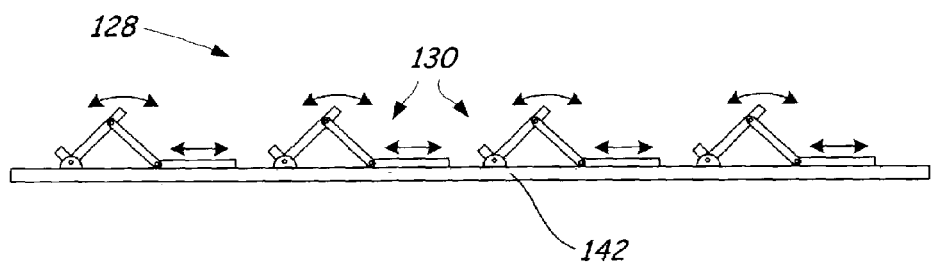
FIG. 8A is a side view of an array of inchworm-type MEMS devices and FIG. 8B is a side perspective view of an inchworm-type MEMS device suitable for use with the present invention.
Figure 8B:
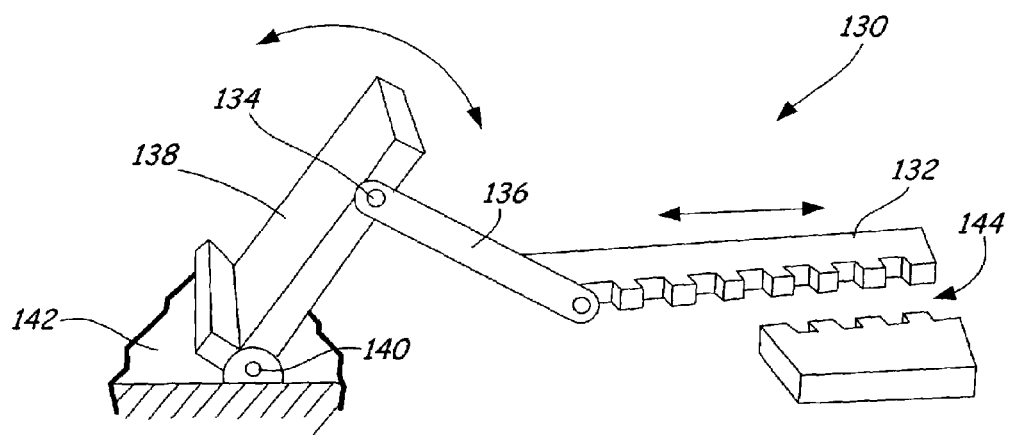

FIGS. 8A and 8B illustrate yet another type of MEMS device suitable for use with the present invention. Shown in FIG. 8A is an array 128 of inchworm type MEMS devices 130, while FIG. 8B is a side perspective view showing more details of an individual inchworm type MEMS device 130. The inchworm motor 130 comprises a shuttle 132, a hinge 134, and a lever arm 136. Also, the inchworm MEMS device 130 comprises a slider receiving platform 138, hinge 140, and substrate 142. The shuttle 132 may further comprise a plurality of teeth 144. To move the inchworm motor 130, the shuttle 132 may be electrostatically actuated. Movement of the shuttle 132 in the lateral direction in turn causes the platform 138 to move in a rotational direction due to the hinges 134, 140 and arm 136. The inchworm MEMS device 130 is similar to the device disclosed by Holler et. al. in an article entitled, "Robot Leg Motion in a Planarized-SOI, 2 Poly Process."

Using the inchworm motor may be desirable because a key feature of the inchworm motor 130 is that the shuttle 132 is static and stable during non-actuation due to the force of friction securing the position of the shuttle 132. The inchworm motor, or any similar shuttle based positioning system, allows steady state static positioning during non-actuation. In other words, once the inchworm motor is positioned, the power can be cut off, and the motor will remain locked in place during the mill process.

It is possible to place the sliders in the array of MEMS devices using a pick and place operation. In addition, to further allow for batch mode processing of a plurality of individual sliders, it may be desirable to mount several sliders on a common web, substrate, or carrier to allow them to more easily be loaded into a MEMS array. Though there are a variety of designs available, FIGS. 9 and 10 illustrate two such suitable web designs.

Figure 9:
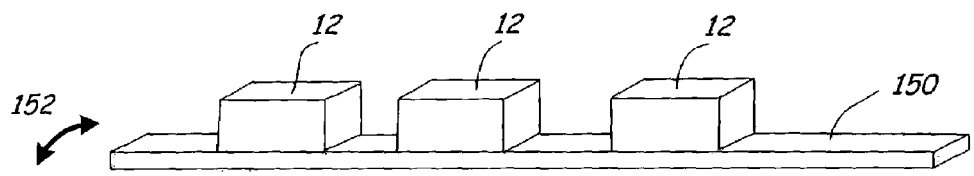
FIG. 9 is a perspective view of one method for providing an array of sliders on a common carrier.

FIG. 9 is a perspective view of a plurality of sliders 12 located on a common substrate 150. The sliders 12 may be connected to the substrate 150 using any suitable method, such as adhesive, bonding, spot welding, or other suitable methods of attachment. Similarly, the substrate 150 may be formed of any of a variety of suitable materials. However, the substrate 150 must be flexible enough to allow torsional rotation of the sliders in the direction of the arrow 152. As such, once the plurality of sliders 12 is loaded into a MEMS device array, though connected by the substrate 150, each of the sliders 12 is still capable of being angularly adjusted due to the flexibility of the substrate 150 in the torsional direction 152.

Figure 10:
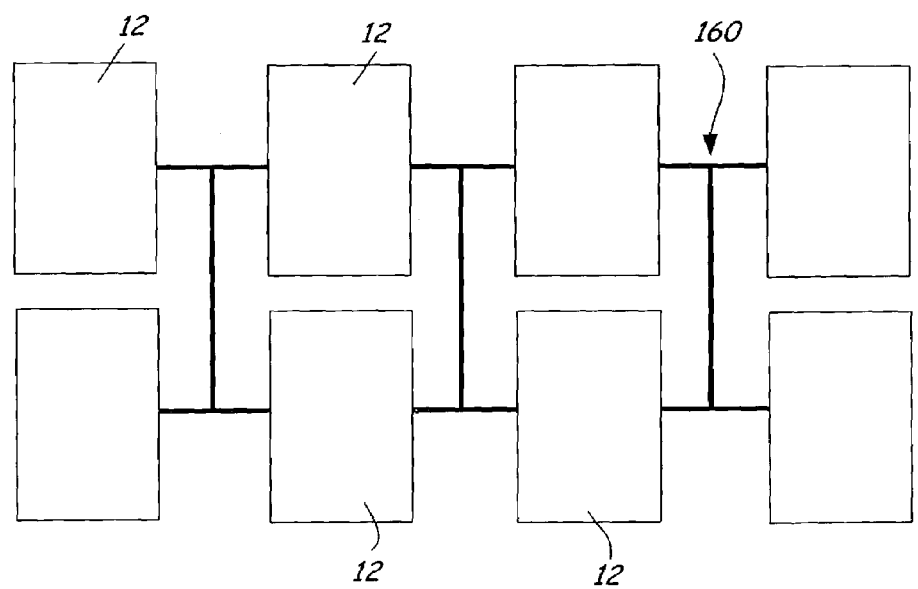
FIG. 10 is a top view of one method for providing an array of sliders on a common substrate.

FIG. 10 shows an alternate method of attaching a plurality of sliders for use in a MEMS device array. Shown in FIG. 10 are a plurality of sliders 12 and a web 160 for attaching them. The web 160 once again may be made of any suitable material, and is preferably connected to the sliders in a temporary or releasable manner. The web 160 is likewise formed of a flexible material which allows for torsional rotation of the sliders 12, as well as individual torsional rotation of each slider 12 relative to the other.

Although the present invention has been described with reference to preferred embodiments, workers skilled in the art will recognize that changes may be made in form and detail without departing from the spirit and scope of the invention.

What is claimed is:

1. A method of controlling machining of a slider, the method comprising:
    measuring a parameter of the slider;
    placing the slider in a micro-electro-mechanical system device capable of angular actuation; and
    controlling an orientation of the slider during machining as a function of the measured parameter by actuating the micro-electro-mechanical system device.

2. The method of claim 1 wherein the parameter of the slider measured comprises a planarity of a plurality of materials on the slider.

3. The method of claim 2 wherein machining comprises ion milling.

4. The method of claim 3 wherein controlling an orientation of the slider during machining is further based on a relationship between an angle at which an ion beam contacts the slider and a mill rate of each material on the slider.

5. A method of individually controlling machining of a component in an array of components, the method comprising:
    measuring a parameter of each component in the array of components;
    placing the array of components in machining device having an array of micro-electro-mechanical system devices configured for individual control, so that each component is associated with a micro-electro-mechanical system device; and
    controlling each micro-electro-mechanical system device during machining based on the measured parameter of the component associated with that micro-electro-mechanical system device.

6. The method of claim 5 and further comprising setting a duration time of the machining and wherein controlling each micro-electro-mechanical system device during machining is further based on a machining rate of the measured parameter.

7. The method of claim 5 wherein the component comprises a plurality of materials and the parameter of the component measured comprises a planarity of the plurality of materials of the component.

8. The method of claim 7 wherein machining comprises ion milling.

9. The method of claim 8 wherein controlling an orientation of the component during machining is further based on a relationship between an angle at which an ion beam contacts the component and a mill rate of each material of the component.

10. A method of controlling the pole tip recession of a slider, the method comprising:
    measuring a pole tip recession on the slider;
    placing the slider in a micro-electro-mechanical system device capable of angular actuation; and
    controlling an orientation of the slider during an ion mill etch process as a function of the measured pole tip recession by actuating the micro-electro-mechanical system device.

11. The method of claim 10 wherein controlling an orientation of the slider during the ion mill etch process is based on a relationship between an angle at which an ion beam contacts the slider and an etch rate of pole tip material and slider substrate material.

12. A method of controlling the pole tip recession of each slider on an array of sliders, the method comprising:
    measuring a pole tip recession of each slider in the array of sliders;
    placing the array of sliders in an ion mill machine having an array of micro-electro-mechanical system devices configured for individual control, so that each slider is associated with a micro-electro-mechanical system device; and
    controlling each micro-electro-mechanical system device during machining based on the measured pole tip recession of the slider associated with that micro-electro-mechanical system device.

13. The method of claim 12 wherein controlling each micro-electro-mechanical system device during machining comprises controlling an angle of the micro-electro-mechanical system device based on a relationship between an angle at which an ion beam contacts the slider air bearing surface and an etch rate of pole tip material and slider substrate material.

14. The method of claim 13 wherein the micro-electro-mechanical system device comprises an electrostatically actuated device and controlling the angle of the micro-electro-mechanical system device comprises applying a voltage to the micro-electro-mechanical system device.

15. The method of claim 14 wherein the electrostatically actuated device comprises a shuttle based positioning device configured for steady state static positioning during non-actuation.

16. The method of claim 13 wherein the micro-electro-mechanical system device comprises a bimorph thermal expansion actuation device and controlling the angle of the micro-electro-mechanical system device comprises controlling a temperature of the bimorph actuation device.

17. The method of claim 13 wherein the micro-electro-mechanical system device comprises a piezoelectric actuation device and controlling the angle of the micro-electro-mechanical system device comprises controlling a voltage across the piezoelectric actuation device.

18. The method of claim 13 wherein the micro-electro-mechanical system device comprises a shape memory actuation device and controlling the angle of the micro-electro-mechanical system device comprises controlling a parameter related to shape memory of the actuation device.

19. The method of claim 18 wherein the parameter comprises a change in temperature.

20. The method of claim 18 wherein the parameter comprises an electrical current.

21. A method of machining an array of sliders to obtain a desired pole tip recession on an air bearing surface of each slider, the method comprising:
associating a micro-electro-mechanical system device with each slider of the array;
machining the slider air bearing surface of each slider in the array with an ion beam; and
controlling each micro-electro-mechanical systems device to obtain a desired location of the slider air bearing surface with respect to an angle of the ion beam.

22. The method of claim 21 wherein the micro-electro-mechanical system device comprises an electrostatically actuated device in controlling each micro-electro-mechanical systems device comprises applying a voltage to the micro-electro-mechanical system device.

23. The method of claim 22 wherein the electrostatically actuated device comprises a shuttle based micro-electro-mechanical system device configured for steady state static positioning during non-actuation.

24. The method of claim 21 wherein the micro-electro-mechanical system device comprises a bimorph thermal expansion actuation device and controlling each micro-electro-mechanical system device comprises controlling a temperature of the bimorph actuation device.

25. The method of claim 21 wherein the micro-electro-mechanical system device comprises a piezoelectric actuation device and controlling the micro-electro-mechanical system device comprises controlling a voltage across the piezoelectric actuation device.

26. The method of claim 21 wherein the micro-electro-mechanical system device comprises a shape memory actuation device and controlling the micro-electro-mechanical system device comprises controlling a parameter related to the shape memory of the actuation device.

27. The method of claim 26 wherein the parameter comprises a change in temperature.

28. The method of claim 26 wherein the parameter comprises an electric current.

29. An apparatus for machining an array of sliders, the apparatus comprising:
an array of micro-electro-mechanical system devices; and
a control system, the control system comprising:
a data acquisition unit for acquiring data relating to the pole tip recession of a slider to be machined;
a process controller to control an etching process; and
a micro-electro-mechanical system driver to individually control each micro-electro-mechanical system device in the micro-electro-mechanical system device array.

30. The apparatus of claim 29 and further comprising an in-situ measuring device for measuring a pole tip recession of a slider.

31. The apparatus of claim 29 and further comprising a plurality of sliders formed on a web.

32. The apparatus of claim 29 and further comprising a user interface display.

33. The apparatus of claim 29 wherein the control system further comprises a controller for correlating an etch rate of a pole region on a slider and an ion incidence angle of the ion beam.

34. The apparatus of claim 33 wherein the control system further comprises a controller for correlating an etch rate of a substrate of the slider and an ion incidence angle of the ion beam.

* * * * *

UNITED STATES PATENT AND TRADEMARK OFFICE
CERTIFICATE OF CORRECTION

PATENT NO. : 6,979,389 B2 Page 1 of 1
APPLICATION NO. : 10/610004
DATED : December 27, 2005
INVENTOR(S) : Shanlin Hao et al.

It is certified that error appears in the above-identified patent and that said Letters Patent is hereby corrected as shown below:

Column 5, Line 63, delete "FIG. 413", insert --FIG. 5B--

Signed and Sealed this

Nineteenth Day of December, 2006

JON W. DUDAS
*Director of the United States Patent and Trademark Office*